United States Patent
Tachibana et al.

[19]

[11] Patent Number: 6,055,595
[45] Date of Patent: Apr. 25, 2000

[54] APPARATUS AND METHOD FOR STARTING AND TERMINATING AN APPLICATION PROGRAM

[75] Inventors: Yoshimi Tachibana; Naoki Ueda, both of Tokyo, Japan

[73] Assignee: Kabushiki Kaisha Toshiba, Kawasaki, Japan

[21] Appl. No.: 08/933,098

[22] Filed: Sep. 18, 1997

[30] Foreign Application Priority Data

Sep. 19, 1996 [JP] Japan .................................. 8-247896

[51] Int. Cl.⁷ ............................. G06F 13/10; G06F 9/445
[52] U.S. Cl. ......................... 710/102; 710/104; 713/100
[58] Field of Search .................................. 395/281–284, 395/837, 651; 710/101–104, 62, 17; 713/1, 2, 100; 307/38, 39

[56] References Cited

U.S. PATENT DOCUMENTS

| | | | |
|---|---|---|---|
| 4,709,137 | 11/1987 | Yoshida | 705/41 |
| 5,161,102 | 11/1992 | Griffen et al. | 395/284 |
| 5,530,862 | 6/1996 | Wadsworth et al. | 395/651 |
| 5,555,510 | 9/1996 | Verseput et al. | 395/282 |
| 5,721,583 | 2/1998 | Harada et al. | 348/12 |
| 5,767,869 | 6/1998 | Saito | 346/82 |

FOREIGN PATENT DOCUMENTS 8-234991  9/1996  Japan .

*Primary Examiner*—Gopal C. Ray
*Attorney, Agent, or Firm*—Finnegan, Henderson, Farabow, Garrett & Dunner, L.L.P.

[57] ABSTRACT

A utility program previously registers card/program registration information indicating a correspondence relation between the names of various cards and file names of various application programs used for effecting processes for the respective cards into a registry of an OS. The utility program acquires information indicating data of insertion/removal and the name of an expansion card inserted into or removed from a card slot by referring to device information held in the registry. The utility program derives a file name of an application program corresponding to the acquired name of the expansion card by referring to the card/program registration information registered in the registry and requesting the OS to start the application program when the data of insertion/removal indicates the insertion.

48 Claims, 16 Drawing Sheets

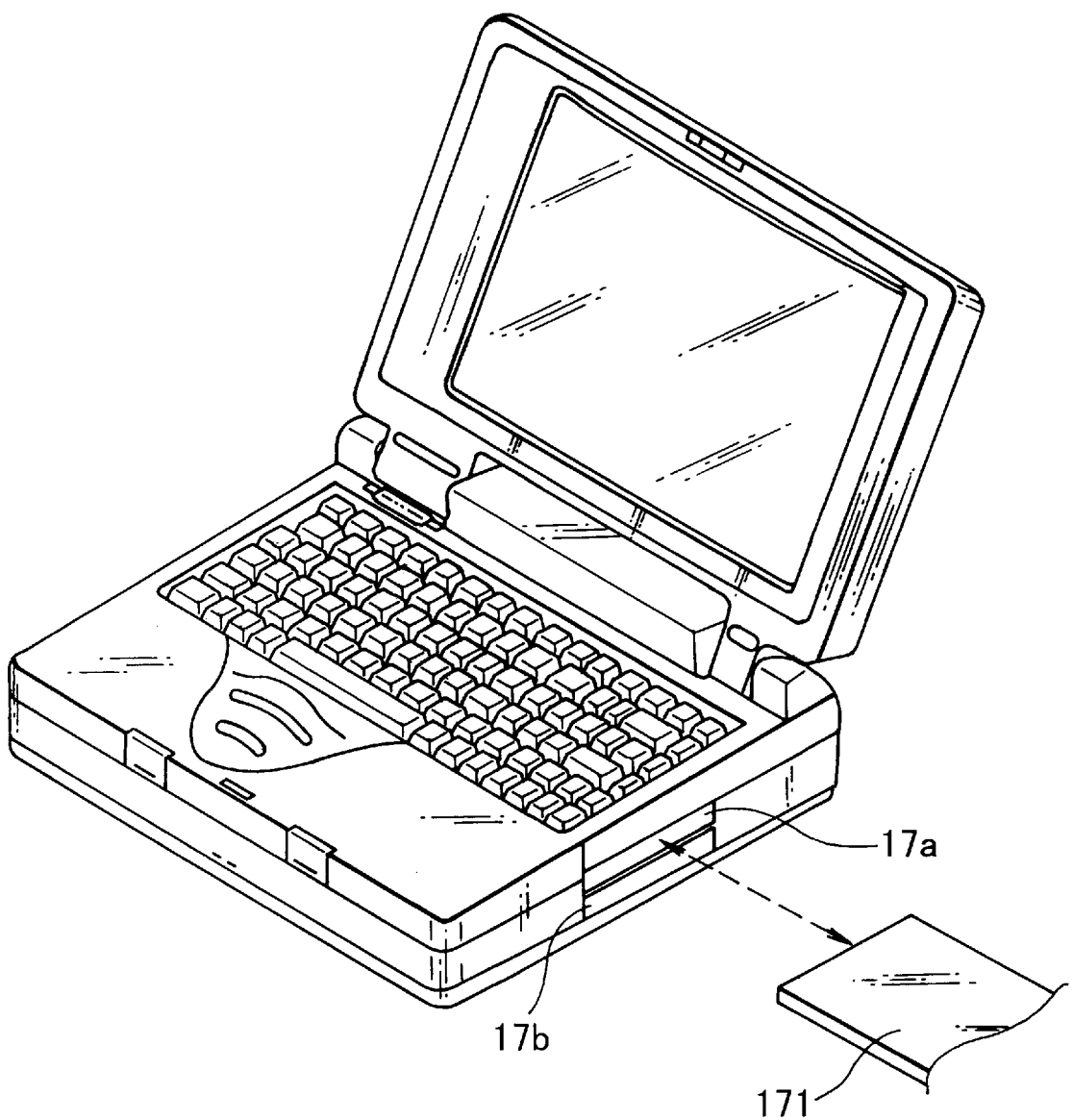
F I G. 2

```
HKEY_LOCAL_MACHINE¥Enum¥PCMCIA
  ├─ MDFCA00A-DC83  ~51
  │   └─ 0
  │       ├─ "DeviceDesc"="MDFCA00A"  ~511
  │       └─ "Class"="Modem"  ~512
  ├─ LANC200A-8658  ~52
  │   └─ 0
  │       ├─ "DeviceDesc"="PC-Card Ether Adapter"  ~521
  │       └─ "Class"="Net"  ~522
```

F I G. 5A

```
HKEY_LOCAL_MACHINE¥System¥CurrentControlSet¥Services¥Class
  ├─ Modem
  │   └─ "STANDARD"="MODEM"  ~531
  ├─ Net
  │   └─ "STANDARD"="NETWORK ADAPTER"  ~532
```

F I G. 5B

```
HKEY_DYN_DATA¥Config Manager¥Enum
  ├─ C1150580
  │   └─ "HardWareKey"="ROOT¥¥*PNP0C01¥¥0000"  ~611
  ├─ C1149308
  │   └─ "HardWareKey"="BIOS¥¥*PNP0C01¥¥00"  ~612
  ├─ C1180B0C
  │   └─ "HardWareKey"="PCMCIA¥¥LANC200A-8658¥¥0"  ~613
```

F I G. 6

| BASIC INFORMATION | | HKEY_CURRENT_USER¥Software¥CardAid |
|---|---|---|
| NAME | TYPE | CONTENTS |
| startrun | CHARACTER STRING | WHETHER PROGRAM IS EXECUTED OR NOT AT STARTING TIME OF CARD AID (1···EXECUTE 0···NOT EXECUTE) |
| select | CHARACTER STRING | CONFIRM STARTING AT INSERTION TIME (1···CONFIRM 0···NOT CONFIRM) |
| kind | CHARACTER STRING | TYPE OF AUTOMATIC STARTING (1···UNIT OF TYPE 0···UNIT OF CARD) |
| card | KEY | INFORMATION IN A CASE WHERE PROGRAM IS STARTED IN UNIT OF CARD |
| class | KEY | INFORMATION IN A CASE WHERE PROGRAM IS STARTED IN UNIT OF TYPE OF CARD |

F I G. 8A

| INFORMATION IN UNIT OF CARD | | HKEY_CURRENT_USER¥Software¥CardAid¥card |
|---|---|---|
| NAME | TYPE | CONTENTS |
| [CARD NAME] | KEY | INFORMATION FOR EACH CARD IS STORED. KEY NAME BECOMES NAME OF PC CARD. KEYS FOR REGISTERED CARDS ARE CREATED. |

F I G. 8B

| INFORMATION OF EACH CARD | HKEY_CURRENT_USER¥Software¥CardAid¥[CARD NAME] | |
|---|---|---|
| NAME | TYPE | CONTENTS |
| class | CHARACTER STRING | TYPE OF CARD (USED WHEN NECESSARY) |
| MF | CHARACTER STRING | WHETHER CARD IS MULTI-FUNCTION CARD OR NOT (USED WHEN NECESSARY) |
| AutoClose | CHARACTER STRING | WHETHER AUTOMATIC TERMINATION IS EFFECTED OR NOT (1...AUTOMATIC TERMINATION 0...NO) |
| Program | KEY | PROGRAM INFORMATION TO BE ASSOCIATED WITH PRESENT CARD |

FIG. 8C

| INFORMATION FOR EACH TYPE | HKEY_CURRENT_USER¥Software¥CardAid¥class | |
|---|---|---|
| NAME | TYPE | CONTENTS |
| [CLASS NAME] | KEY | INFORMATION FOR EACH TYPE IS STORED. KEY NAME BECOMES NAME OF TYPE. KEYS FOR TYPES OF PC CARDS WHICH HAVE BEEN INSERTED ARE CREATED. |

FIG. 8D

| INFORMATION FOR EACH TYPE | HKEY_CURRENT_USER¥Software¥CardAid¥class¥[CALSS NAME] | |
|---|---|---|
| NAME | TYPE | CONTENTS |
| AutoClose | CHARACTER STRING | WHETHER AUTOMATIC TERMINATION IS EFFECTED OR NOT (1...AUTOMATIC TERMINATION 0...NO) |
| Program | KEY | PROGRAM INFORMATION TO BE ASSOCIATED WITH PRESENT CARD |

| PROGRAM INFORMATION | HKEY_CURRENT_USER¥Software¥CardAid¥card¥[CARD NAME]¥<br>HKEY_CURRENT_USER¥Software¥CardAid¥class¥[CLASS NAME]¥<br>program(COMMON) |  |
|---|---|---|
| NAME | TYPE | CONTENTS |
| (STANDARD) | CHARACTER STRING | NUMBER (MAXIMUM:5) OF PROGRAMS STORED IN PRESENT INFORMATION |
| default | CHARACTER STRING | NAME OF PROGRAM AUTOMATICALLY STARTED WHEN STARTING IS NOT CONFIRMED |
| [PROGRAM NAME] | KEY | INFORMATION RECATING TO EACH PROGRAM. NAME OF KEYS BECOMES NAME OF PROGRAM |

FIG. 8G

| INFORMATION OF EACH PROGRAM | HKEY_CURRENT_USER¥Software¥CardAid¥card¥[CARD NAME]¥<br>HKEY_CURRENT_USER¥Software¥CardAid¥class¥[CLASS NAME]¥<br>program¥[PROGRAM NAME](COMMON) |  |
|---|---|---|
| NAME | TYPE | CONTENTS |
| name | CHARACTER STRING | FILE NAME OF EXECUTION PROGRAM. OPTION IS ALSO DESCRIBED |
| folder | CHARACTER STRING | WORK FOLDER AT EXECUTION TIME |
| size | DWORD | WINDOW SIZE AT EXECUTION TIME<br>(1···STANDARD 2···MINIMIZE 3···MAXIMIZE 0···CONCEAL) |

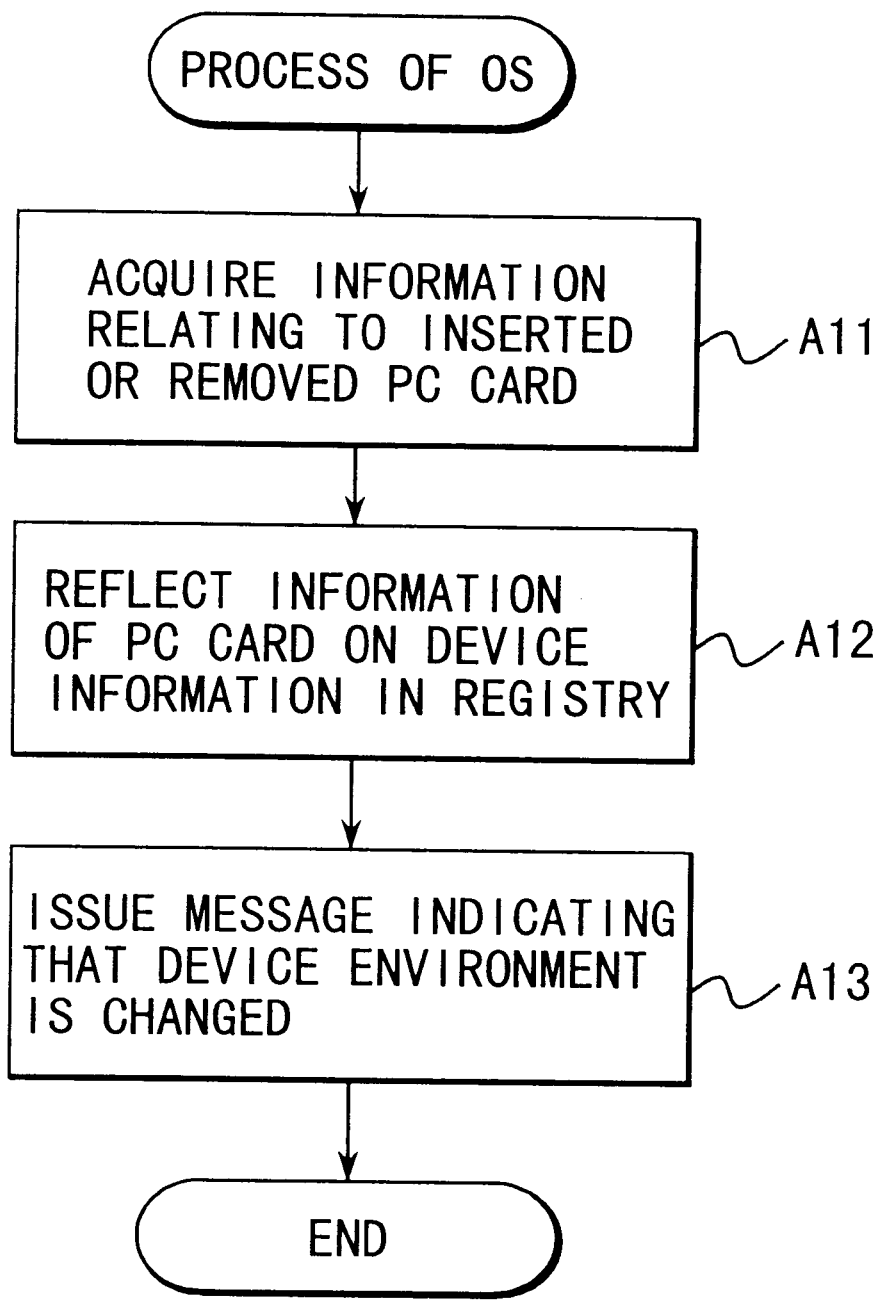
F I G. 11

APPARATUS AND METHOD FOR STARTING AND TERMINATING AN APPLICATION PROGRAM

BACKGROUND OF THE INVENTION

The present invention relates to an information apparatus having an expansion card slot into which an expansion card for expansion of function can be removably inserted and a program starting control method applied to the information apparatus, and more particularly to an information apparatus for effecting the starting and termination of an application program corresponding to an expansion card in response to insertion/removal of the expansion card and a program starting control method.

Recently, personal computers such as palm top type computers and notebook type computers which can be easily carried and operated by a battery and small-sized information terminals such as PDA (Personal Digital Assistants) are variously developed. In order to expand the function, this type of portable information apparatus is constructed such that, for example, an expansion card called a PC card based on PCMCIA (Personal Computer Memory Card International Association) can be mounted thereon when required.

In the conventional portable information apparatus, when the PC card is mounted on the main body of the apparatus, the user selects an application program for executing a process corresponding to the mounted PC card and effects an adequate operation to start the application program. When the PC card is removed, the user effects an adequate operation to terminate the application program corresponding to the PC card.

For example, when the PC cards are exchanged, the user first effects the operation to terminate the application program corresponding to the PC card which is now used then removes the PC card. After inserting another PC card, the user must select an application program corresponding to the inserted PC card and effect the operation to start the application program.

It should be noted here that, in order to start and terminate an application program for effecting the process corresponding to the PC card in response to insertion/removal of the PC card, the user himself must select the application program corresponding to the PC card from a plurality of various types of application programs prepared.

In order to eliminate such a troublesome operation, for example, it is considered that all of the application programs to be executed are started by use of various types of PC cards, but recently, the number of types of PC cards used increases and the effective use of resources becomes indispensable with a reduction in size of the main body of the apparatus, and therefore, the above-described method is not desirable.

Thus, in the conventional portable information terminal, in order to start/terminate the application program for executing the process corresponding to the PC card in response to insertion/removal of the PC card, the user himself must select an adequate application program corresponding to the PC card from a plurality of various types of application programs prepared and it is difficult to say that the environment which is convenient for the user is sufficiently provided.

Therefore, it is desired to automatically select and start/terminate the application program for executing the process corresponding to the PC card in response to insertion/removal of the PC card and reduce the user's load.

BRIEF SUMMARY OF THE INVENTION

Accordingly, it is an object of the present invention to provide an information apparatus which can automatically select and start/terminate an application program for executing the process corresponding to a PC card in response to insertion/removal of the PC card and a program starting control method.

According to one aspect of the present invention, there is provided an information apparatus comprising: a card slot which permits insertion/removal of an expansion card; an operating system (OS) having a registry; means for registering card/program registration information indicating a correspondence relation between names of various cards and file names of various application programs used for effecting processes for the respective cards into the registry; means for acquiring information indicating data of insertion/removal and a name of an expansion card inserted into or removed from the card slot by referring to device information held in the registry; and means for deriving a file name of an application program corresponding to the acquired name of the expansion card by referring to the card/program registration information registered in the registry and requesting the OS to start the application program when the data of insertion/removal indicates the insertion.

According to another aspect of the present invention, there is provided an information apparatus comprising: a card slot which permits insertion/removal of an expansion card; an operating system (OS) having a registry; means for registering card/program registration information indicating a correspondence relation between names of various cards and names of types for the various cards and a correspondence relation between the names of the various types and file names of various application programs used for effecting processes corresponding to the names of the various types into the registry; means for acquiring information indicating data of insertion/removal and a name of an expansion card inserted into or removed from the card slot by referring to device information held in the registry; and means for deriving a name of type corresponding to the acquired name of the expansion card and deriving a file name of an application program corresponding to the derived name of type by referring to the card/program registration information registered in the registry and requesting the OS to start the application program when the data of insertion/removal indicates the insertion.

According to another aspect of the present invention, there is provided a program starting control method for use in an information apparatus including a card slot which permits insertion/removal of an expansion card and an operating system (OS) having a registry, the method comprising the steps of: registering card/program registration information indicating a correspondence relation between names of various cards and file names of various application programs used for effecting processes for the respective cards into the registry; acquiring information indicating data of insertion/removal and a name of an expansion card inserted into or removed from the card slot by referring to device information held in the registry; and deriving a file name of an application program corresponding to the acquired name of the expansion card by referring to the card/program registration information registered in the registry and requesting the OS to start the application program when the data of insertion/removal indicates the insertion.

According to another aspect of the present invention, there is provided a program starting control method for use in an information apparatus including a card slot which permits insertion/removal of an expansion card and an operating system (OS) having a registry, the method comprising the steps of: registering card/program registration information indicating a correspondence relation between names of various cards and names of types for the various cards and a correspondence relation between the names of the various types and file names of various application programs used for effecting processes corresponding to the names of the various types into the registry; acquiring information indicating data of insertion/removal and a name of an expansion card inserted into or removed from the card slot by referring to device information held in the registry; and deriving a name of type corresponding to the acquired name of the expansion card and deriving a file name of an application program corresponding to the derived name of type by referring to the card/program registration information registered in the registry and requesting the OS to start the application program when the data of insertion/removal indicates the insertion.

According to another aspect of the present invention, there is provided a storage medium having program code instructions stored thereon which can perform program starting control when executed by a processor in an information apparatus including a card slot which permits insertion/removal of an expansion card and an operating system (OS) having a registry, the instructions comprising the steps of: registering card/program registration information indicating a correspondence relation between names of various cards and file names of various application programs used for effecting processes for the respective cards into the registry; acquiring information indicating data of insertion/removal and a name of an expansion card inserted into or removed from the card slot by referring to device information held in the registry; and deriving a file name of an application program corresponding to the acquired name of the expansion card by referring to the card/program registration information registered in the registry and requesting the OS to start the application program when the data of insertion/removal indicates the insertion.

According to another aspect of the present invention, there is provided a storage medium having program code instructions stored thereon which can perform program starting control when executed by a processor in an information apparatus including a card slot which permits insertion/removal of an expansion card and an operating system (OS) having a registry, the instructions comprising the steps of: registering card/program registration information indicating a correspondence relation between names of various cards and names of types for the various cards and a correspondence relation between the names of the various types and file names of various application programs used for effecting processes corresponding to the names of the various types into the registry; acquiring information indicating data of insertion/removal and a name of an expansion card inserted into or removed from the card slot by referring to device information held in the registry; and deriving a name of type corresponding to the acquired name of the expansion card and deriving a file name of an application program corresponding to the derived name of type by referring to the card/program registration information registered in the registry and requesting the OS to start the application program when the data of insertion/removal indicates the insertion.

Additional objects and advantages of the present invention will be set forth in the description which follows, and in part will be obvious from the description, or may be learned by practice of the present invention. The objects and advantages of the present invention may be realized and obtained by means of the instrumentalities and combinations particularly pointed out in the appended claims.

BRIEF DESCRIPTION OF THE SEVERAL VIEWS OF THE DRAWING

The accompanying drawings, which are incorporated in and constitute a part of the specification, illustrate presently preferred embodiments of the present invention and, together with the general description given above and the detailed description of the preferred embodiments given below, serve to explain the principles of the present invention in which:

FIG. 2 is a perspective view showing the appearance of the portable information apparatus of the above embodiment;

FIGS. 5A and 5B are diagrams showing the structures of PC card information items held in the registry shown in FIG. 4;

FIG. 6 is a diagram showing the structure of device information held in the registry shown in FIG. 4;

FIGS. 8A to 8G are diagrams showing card/program registration information of FIG. 7 in detail;

FIG. 11 is a flowchart showing the operation procedure effected by the operating system;

DETAILED DESCRIPTION OF THE INVENTION

There will now be described an embodiment of the present invention with reference to the accompanying drawings.

Figure 1:
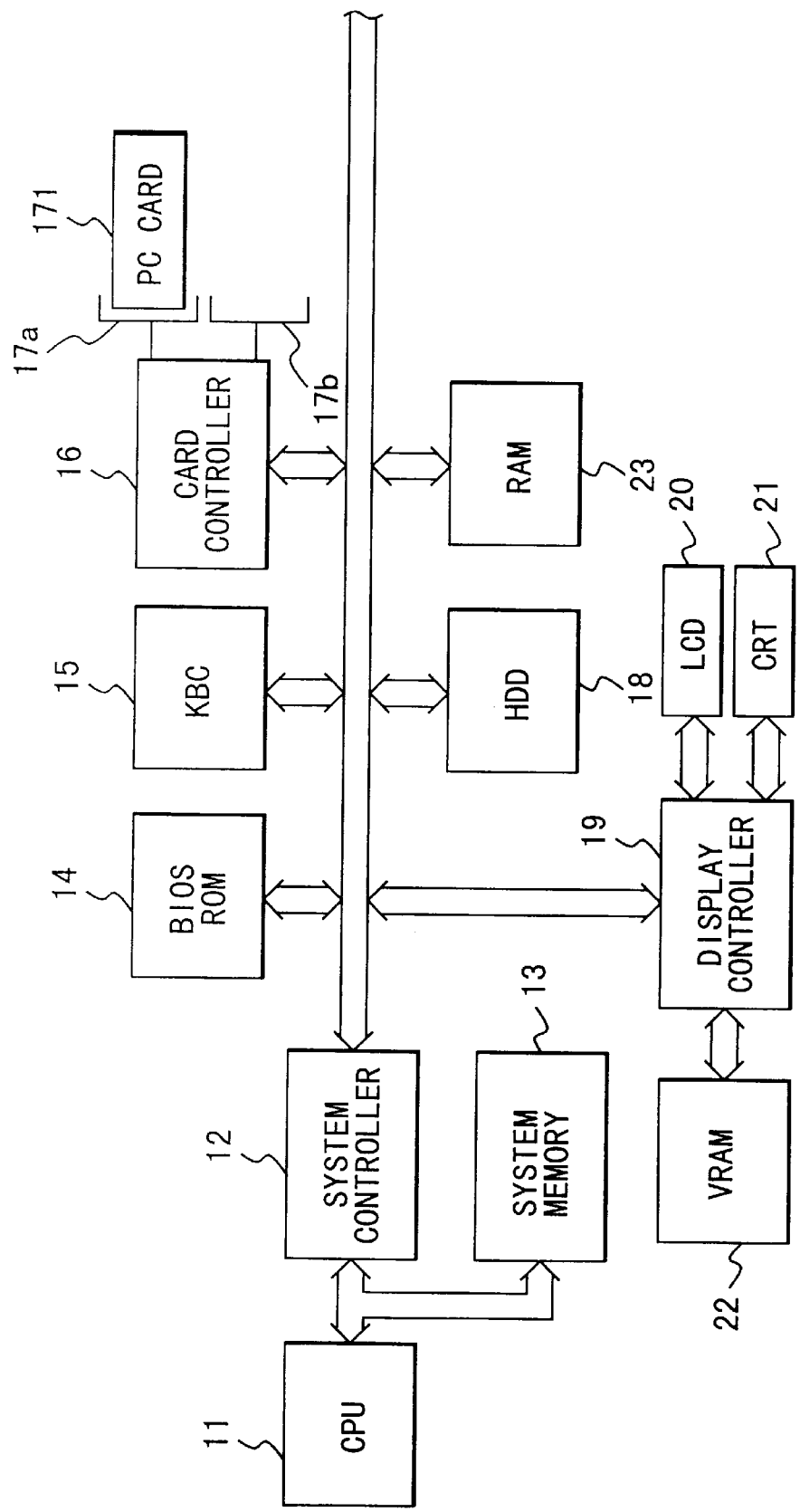
FIG. 1 is a block diagram showing the construction of a portable information apparatus according to an embodiment of the present invention.

FIG. 1 is a block diagram showing the construction of a portable information apparatus according to the embodiment.

As shown in FIG. 1, the portable information apparatus according to the embodiment includes a CPU 11, system controller 12, system memory 13, BIOS-ROM 14, keyboard controller (KBC) 15, card controller 16, magnetic disk device (HDD) 18, display controller 19 and RAM 23.

The CPU 11 executes an application program including utility and an operating system stored in the system memory 13. The system controller 12 controls the memory and I/O in the system. The system memory 13 stores the operating system which is executed and controlled by the CPU 11, the application program including utility, and user data created by use of the application program.

The BIOS-ROM 14 stores system-BIOS and VGA-BIOS and is constructed by a flash memory so as to permit the program to be re-written.

The keyboard controller 15 detects the contents of operations of the keyboard and mouse, converts the detected contents into input data and supplies the same into the system.

The card controller 16 notifies the CPU 11 that a PC card 171 is inserted into a PC card slot 17a or 17b formed in the main body of the apparatus and the PC card 171 is removed from the PC card slot 17a or 17b, and drives and controls the PC card 171 according to an instruction from the CPU 11. The magnetic disk device 18 is a secondary memory device of large capacity for transmitting and receiving data to and from the system memory 13. The system controller 19 controls the display operation of an LCD 20 and CRT 21, receives display data from the CPU 11 and writes the same into a VRAM 22.

Figure 3:
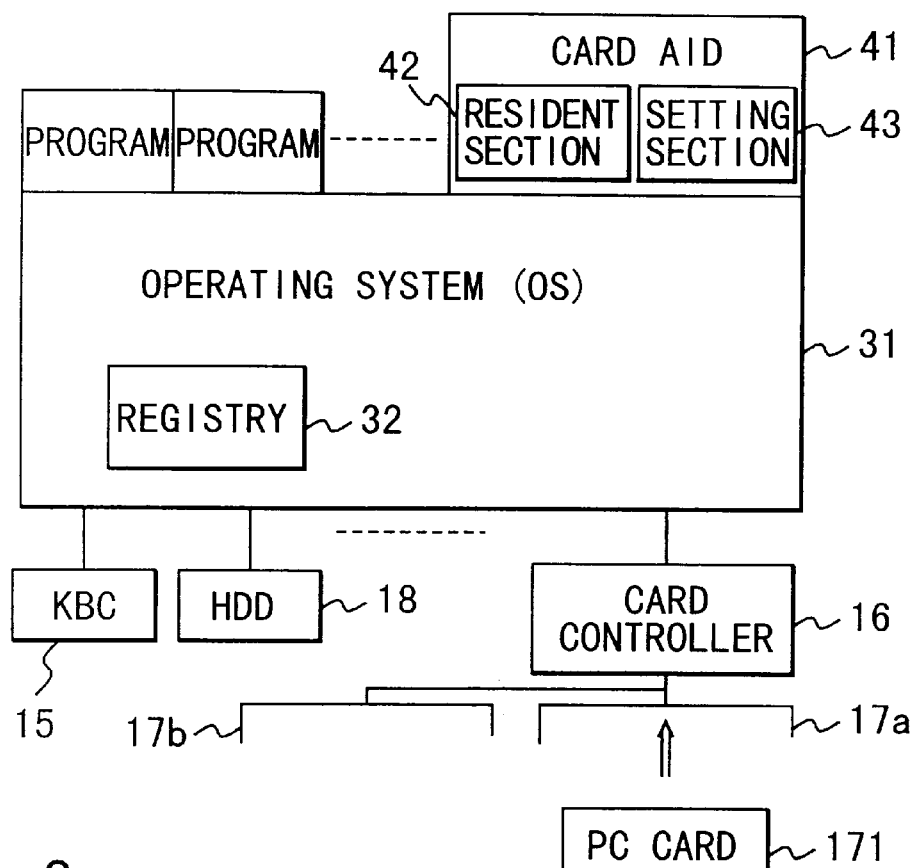
FIG. 3 is a block diagram showing the construction of various functions operated in response to insertion/removal of the PC card in the portable information apparatus of the above embodiment.

FIG. 3 shows a function block of the portable information apparatus of the present embodiment having the above apparatus structure.

An operating system 31 is used to control the entire portion of the system. The operating system 31 offers various services in response to requests from various programs executed under the control of the operating system 31.

The operating system 31 has a registry 32 having various setting information items stored therein. As will be described later in detail, in the registry 32, (1) "PC card information" relating to the history of PC cards which has been inserted into the PC card slot 17a, 17b, (2) "device information" relating to a device which is now connected to the information apparatus, (3) "card/program registration information" indicating the relation between various types of PC cards and corresponding various application programs, and the like are held.

Further, the operating system 31 receives information that the PC card 171 is inserted into the PC card slot 17a via the card controller 16 and CPU 11 when the PC card 171 is inserted into the PC card slot 17a, for example. At this time, the operating system 31 registers information relating to the inserted PC card 171 into the registry 32 and issues a message of WM_device-change. The message of WM_devicechange is a message indicating that the environment of various devices connected to the information apparatus is changed.

When the PC card 171 is removed from the PC card slot 17a, for example, the operating system 31 receives information that the PC card 171 is removed from the PC card slot 17a via the card controller 16 and CPU 11 when the PC card 171 is removed from the PC card slot 17a, for example. At this time, the operating system 31 erases information relating to the removed PC card 171 and registered in the registry 32 and issues the message WM_devicechange.

In this embodiment, a utility program (card aid) 41 for automatically selecting and starting/terminating an application program used for executing a process for the PC card 171 in response to insertion/removal of the PC card 171 is provided. The utility program 41 is operated under the control of the operating system 31.

The utility program 41 includes a resident section 42 which resides on the operating system 41 to monitor insertion/removal of the PC card and execute a necessary process at the time of insertion/removal of the PC card and a setting section 43 for setting the relation between various PC cards and various application programs to be started for the PC cards.

Particularly, when the resident section 42 of the utility program 41 detects the message WM_devicechange indicating that the device environment is changed, it requests the operating system 31 to issue device information held in the registry 32 and acquires information indicating data of insertion/removal and information such as ID of the PC card which is inserted or removed by comparing the newly acquired device information and the old device information previously held in the memory such as the RAM 23, for example.

Further, the setting section 43 of the utility program 41 makes a change and addition of card/program registration information on the registry 32 via a dialogue box or the like displayed on a display screen of the LCD 20 or CRT 21 in response to an instruction from the user.

When recognizing "insertion", the utility program 41 requests the operating system 31 to issue card/program registration information held in the registry 32, acquires information of an application program corresponding to the inserted PC card by referring to the card/program registration information and then requests the operating system 31 to start the application program. In this case, the utility program 41 holds information of the application program to be started in the RAM 23 and reflects the newest device information acquired from the operating system 31 on information in the RAM 23.

Further, when recognizing "removal", the utility program 41 requests the operating system 31 to terminate the application program which is now executed. In this case, the utility program 41 erases information of the application program held in the RAM 23 and reflects the newest device information acquired from the operating system 31 on information in the RAM 23.

Figure 4:
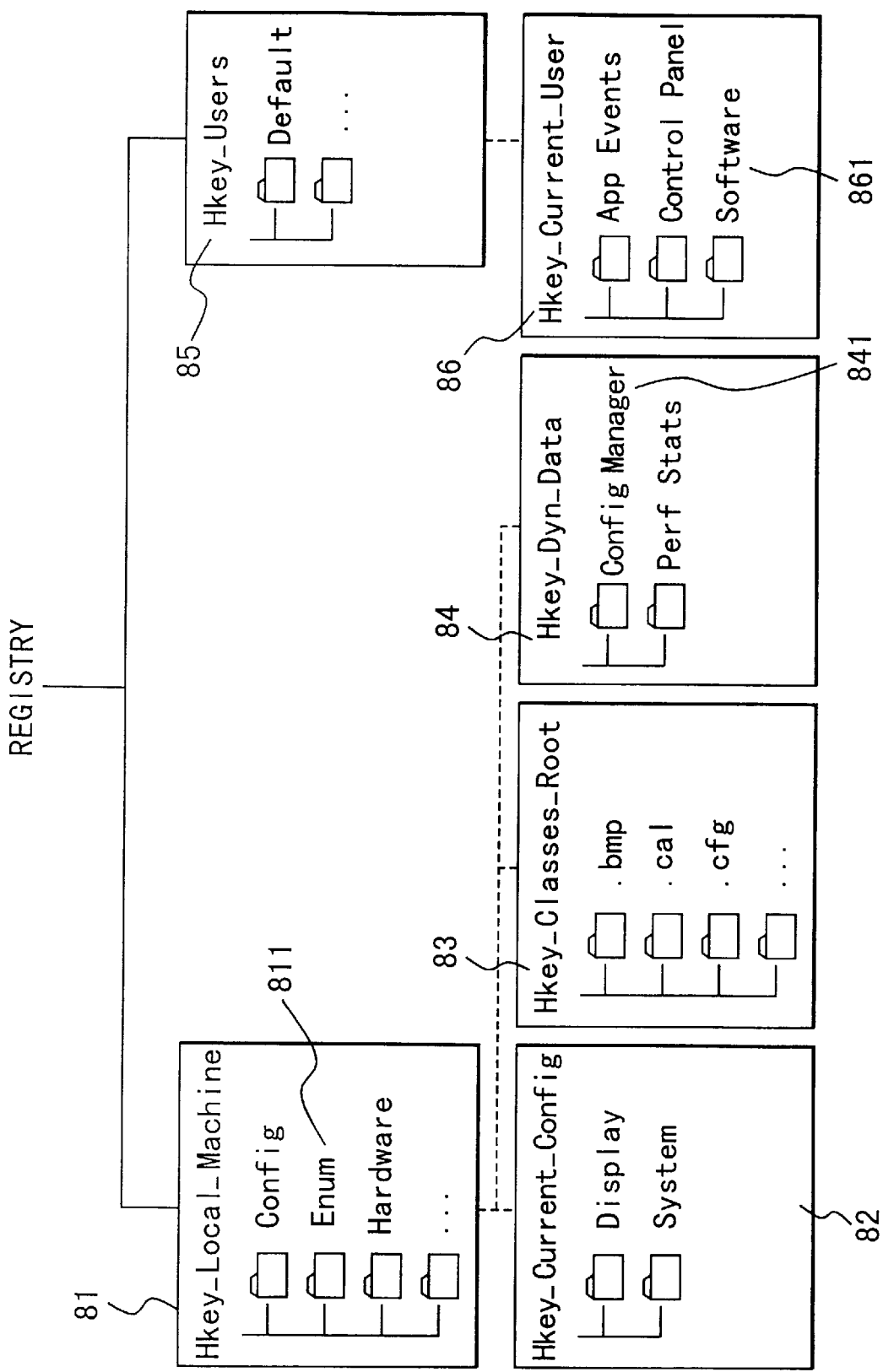
FIG. 4 is a diagram showing the structures of various information items in a registry which an operating system of FIG. 1 has.

Next, the registry 32 contained in the operating system 32 is explained in detail. In the registry 32, the hierarchical structure is constructed by various keys as shown in FIG. 4.

First, Hkey_Local_Machine indicated by a reference numeral 81 holds information inherent to the information apparatus relating to the type of the installed hardware, set information of software and other information.

Particularly, under a key indicated by a reference numeral 811, a key of Hkey_Local_Machine¥Enum¥PCMCIA is provided. The key holds "PC card information" relating to the history of PC cards which has been inserted into the PC card slot 17a, 17b.

Hkey_Current_Config indicated by a reference numeral 82 indicates branching of Hkey_Local_Machine¥Config and holds information relating to the present setting of the hardware connected to the information apparatus.

Hkey_Classes_Root indicated by a reference numeral 83 indicates branching of Hkey_Local_Machine and describes particular software settings.

Hkey_Dyn_Data indicated by a reference numeral 84 indicates branching of Hkey_Local_Machine and holds dynamic status information of various devices and the like.

The information changes each time a device is added to or removed from the information apparatus.

Particularly, under a key indicated by a reference numeral 841, a key of Hkey_Dyn_Data¥ConfigManager¥Enum is provided. The key holds "device information" relating to the device which is now connected to the information apparatus.

Hkey_users indicated by a reference numeral 85 includes information relating to all of the users to be logged on the information apparatus such as general information and information inherent to the user. Hkey_Current_User indicated by a reference numeral 86 indicates branching of Hkey_users relating to the users now logged on.

Further, as will be described later, for example, "card-program registration information" relating to the present invention and indicating the correspondence relation between the PC card and the application program is held by Hkey_Current_User¥Software¥CardAid prepared under a key indicated by a reference numeral 861. The card/program registration information is utilized by the utility program 41.

FIG. 5A is a diagram showing the detail of "PC card information" relating to the history of PC cards which has been inserted into the PC card slots 17a and 17b. The PC card information is used when the user adds and sets a new item in the card/program registration information (which will be described later). As described before, the PC card information is held in Hkey_Local_Machine¥Enum¥PCMCIA.

MDFCA00A-DC83 indicated by a reference numeral 51 and LANC200A-8658 indicated by a reference numeral 52 indicate IDs of PC cards which have been inserted. MDFCA00A-DC83 indicated by a reference numeral 511 and MODEM indicated by a reference numeral 512 respectively indicate the name and type of the PC card MDFCA00A-DC83. Likewise, PC-Card Ether Adapter indicated by a reference numeral 521 and NET indicated by a reference numeral 522 respectively indicate the name and type of the PC card LAN200A-8658.

FIG. 5B is a diagram showing keys for holding the formal names of the types of PC cards. The formal name of the type of the PC card is held by a key of Hkey_Local_Machine¥System¥CurrentControlSet¥Services¥Class, for example. "Modem" of reference numeral 531 and "network adapter" of reference numeral 532 respectively indicate the formal names of the type Modem and of NET described above.

FIG. 6 is a diagram showing the detail of "device information" relating a device now connected to the information apparatus. The device information is utilized by the utility program 41 in order to acquire information indicating data of insertion/removal and the ID of the PC card inserted or removed when the device environment is changed. As described before, the device information is held in Hkey_Dyn_Data ¥ConfigManager¥Enum.

Among information items of various devices indicated by reference numerals 611 to 613, PCMCIA ¥¥LANC200A-8658¥¥0 of reference numeral 613 is information indicating the PC card which is now inserted in the PC card slot 17a, 17b. In this case, "PCMCIA" indicates that a device now inserted is a PC card. "LANC200A-8658" indicates the ID of the PC card now inserted. Further, after "¥¥0", information (not shown) indicating the name and type of the PC card is held. Thus, information starting with PCMCIA¥¥ is information relating to a PC card. Further, other information relating to the PC card is provided by information of PCMCIA¥¥PCCARD¥¥0 (not shown).

Figure 7:
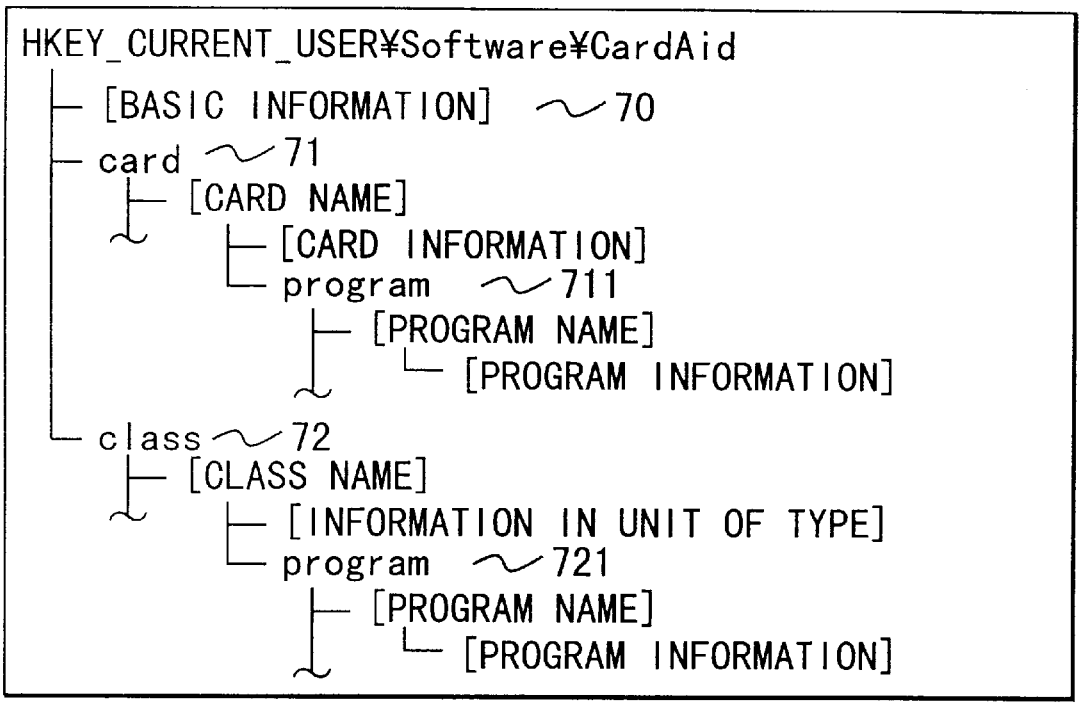
FIG. 7 is a diagram showing the structure of card/program registration information held in the registry shown in FIG. 4.

FIG. 7 is a diagram showing the detail of "card/program registration information" indicating the correspondence relation between various types of PC cards and various types of application programs corresponding thereto. The card/program registration information is utilized by the utility program 41 to acquire information of an application program to be started when the PC card is inserted into the PC card slot 17a or 17b. As described above, the card/program registration information is held in Hkey_Current_User¥Software¥CardAid.

"Basic information" of reference numeral 70 indicates basic information dealt with by Hkey_Current_User¥Software¥CardAid. A card key of reference numeral 71 holds information for each PC card and information items of various application programs corresponding to the PC cards. A class key of reference numeral 72 holds information for each type of PC card and information items of various application programs corresponding to the types.

Specifically, the basic information 70 includes various information items of character strings such as startrun, select and kind, and keys of a card and a class (refer to FIG. 8A).

The card key 71 has a "card name" key for each PC card (refer to FIG. 8B). The "card name" indicates the name of a PC card. Each [card name] key includes [card information] of a character string such as class, MF and AutoClose and a program key 711 (refer to FIG. 8C). Particularly, in the information of class, the type of PC card can be specified. Specification of the type is effected when it is necessary to start a corresponding application program according to the type of the PC card. The specification of type is not effected when a corresponding application program is started according to the name of the PC card.

The program key 711 has information of one or a plurality of application programs corresponding to the PC card. That is, the program key 711 has information of character string such as default and one of a plurality of [program name] keys (refer to FIG. 8F). The [program name] indicates the name of an application program. Each [program name] key has information of character string such as name and folder and information of DWORD such as size (refer to FIG. 8G). Particularly, the information of name indicates the file name of an application program (execution program) to be executed.

The class key 72 has a [class name] key for each type of PC card (refer to FIG. 8D). The [class name] indicates the name of type of PC card. Each [class name] key has [information for each unit of type] of character string such as AutoClose and a program key 721 (refer to FIG. 8E).

Like the case of the program key 711, the program key 721 has information of one or a plurality of application programs corresponding to the PC card. That is, the program key 711 has information of character string such as default and one of a plurality of [program name] keys (refer to FIG. 8F). Each [program name] key has information of character string such as name and folder and information of DWORD such as size (refer to FIG. 8G).

Next, a method for setting card/program registration information on the registry 32 is explained. In this example, a case wherein the user adds and sets a new item in the card/program registration information held in the registry via the display screen is considered. The following cases are explained.

(1) A case wherein the user newly adds and sets the name of a PC card and the file name of an application program (execution program) corresponding thereto (when information is set in the unit of card).

(2) A case wherein the user newly adds and sets the type of a PC card and information of an application program (execution program) corresponding thereto (when information is set in the unit of type).

Figure 9A:
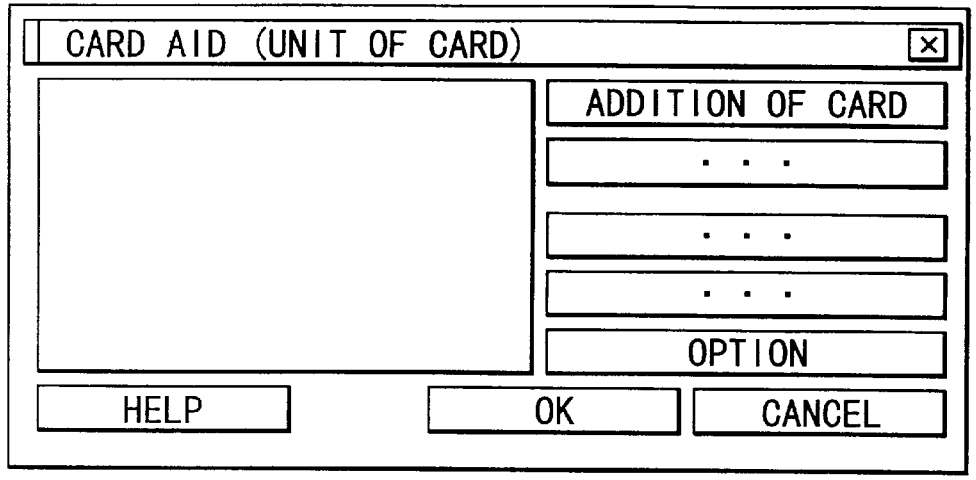
FIGS. 9A to 9E are diagrams showing dialogue boxes used for setting card/program registration information in the unit of PC card.

The user operates the setting section 43 of the utility program 41 to display a display screen on which information is set in the "card unit" on the LCD 20 or CRT. In this case, a dialogue box for the "card unit" shown in FIG. 9A is displayed.

Figure 9B:
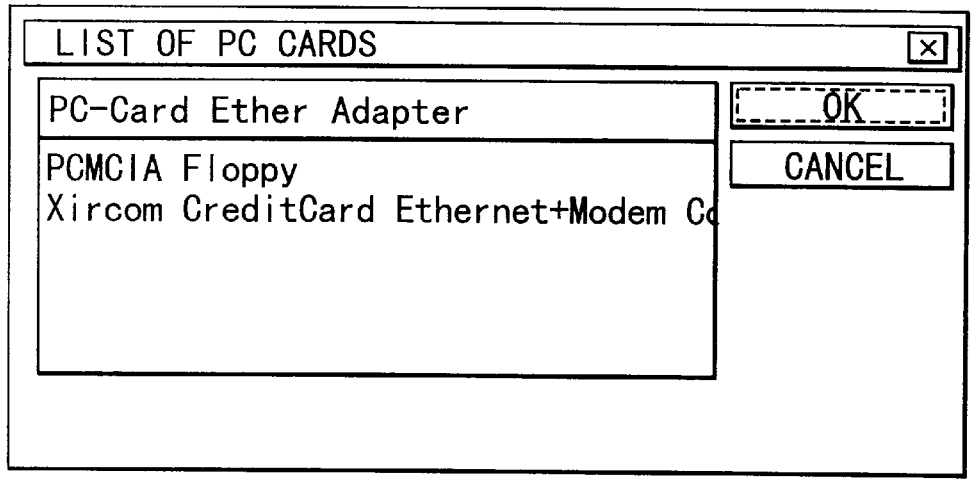

The user refers to a dialogue box of "a list of PC cards" shown in FIG. 9B in order to select the PC card name to be added. In this example, PC card information "Hkey_Local_Machine¥Enum¥PCMCIA" (FIG. 5A) relating to a PC card which has been inserted into the PC card slots 17a and 17b is read out and the PC card name contained therein is displayed.

Figure 9C:
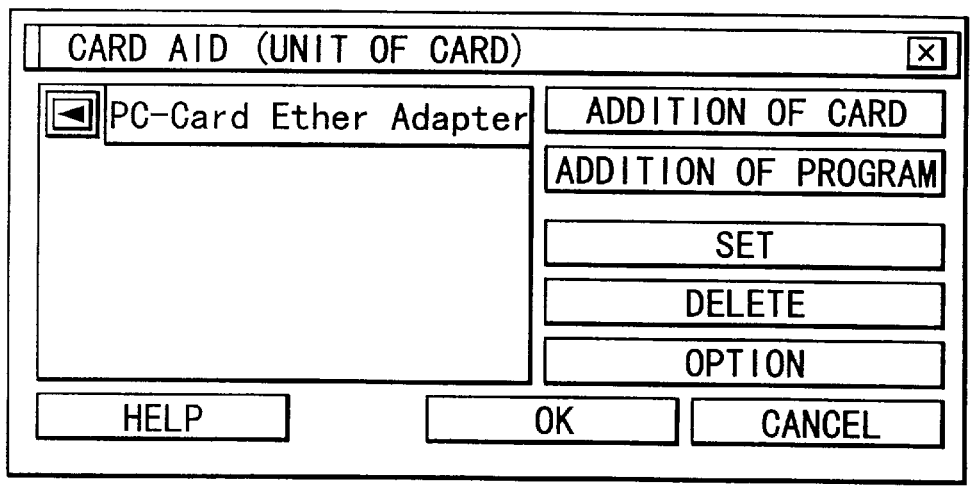

At this time, for example, "PC-Card Ether Adapter" is selected from a plurality of prepared PC card names. After this, the original dialogue box is displayed again as shown in FIG. 9C and "PC-Card Ether Adapter" is displayed. At this time, "PC-Card Ether Adapter" is determined by selecting the "addition of card" button.

Figure 9D:
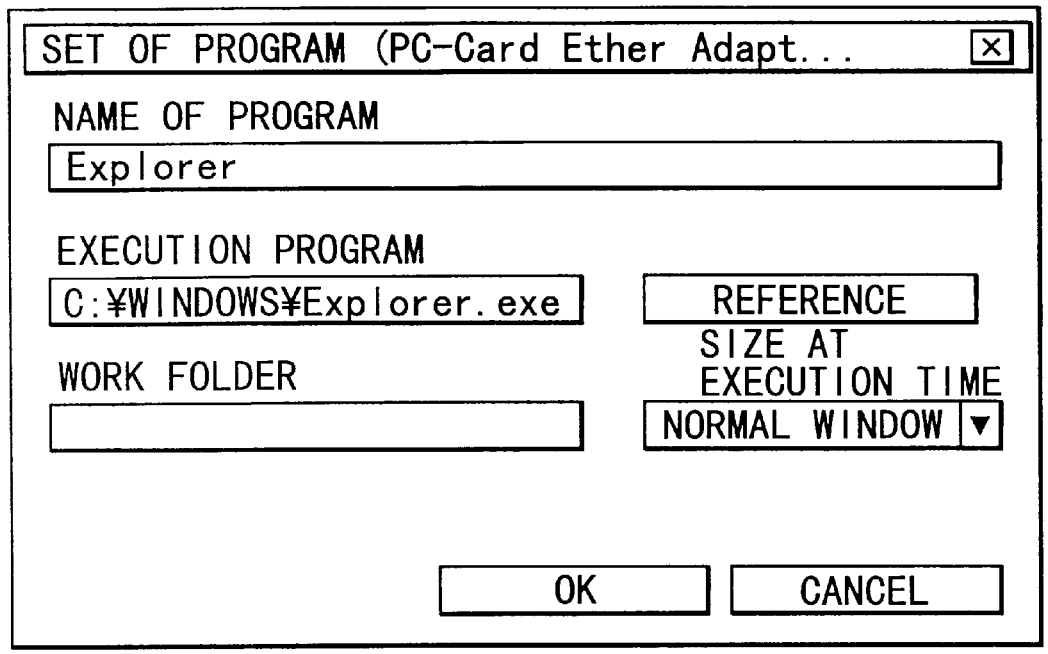

Next, the user effects an adequate operation to display "setting of program" shown in FIG. 9D. At this time, the name of program, execution program and other information corresponding to the PC card name "PC-Card Ether Adapter" which is previously determined are input and determined. For example, "Explorer" is input as the name of the program, "Explorer.exe" is input as the execution program, and then the OK button is depressed.

Figure 9E:
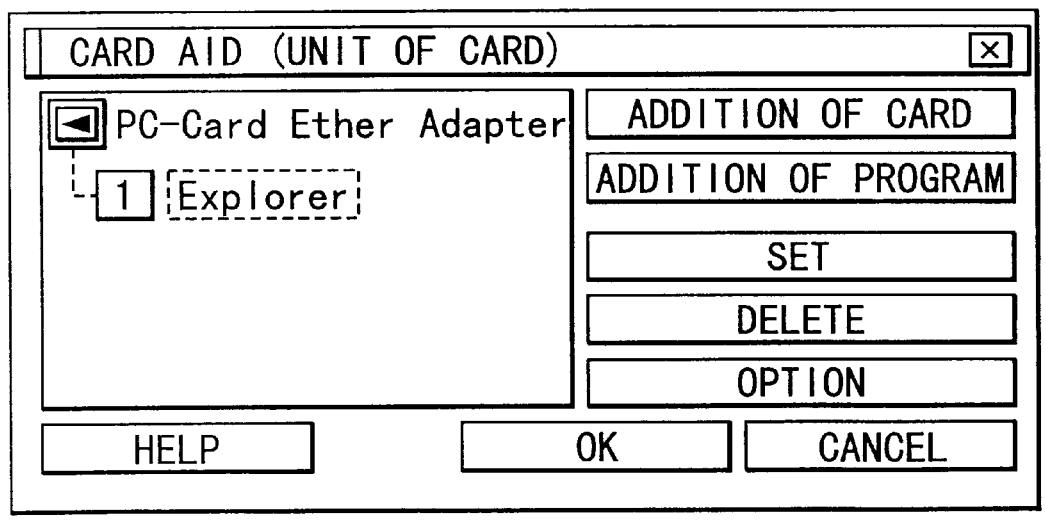

As a result, as shown in FIG. 9E, the correspondence relation between the PC card name "PC-Card Ether Adapter" and the program name "Explorer" is displayed. By determining this relation, the setting process is completed.

Set information obtained at this time is reflected on information under the card key 71 and "program" key 711 among the card/program registration information "Hkey_Local_Machine¥Enum¥PCMCIA" in the registry 32.

Next, the setting process in the "unit of type" in the case (2) is explained.

Figure 10A:
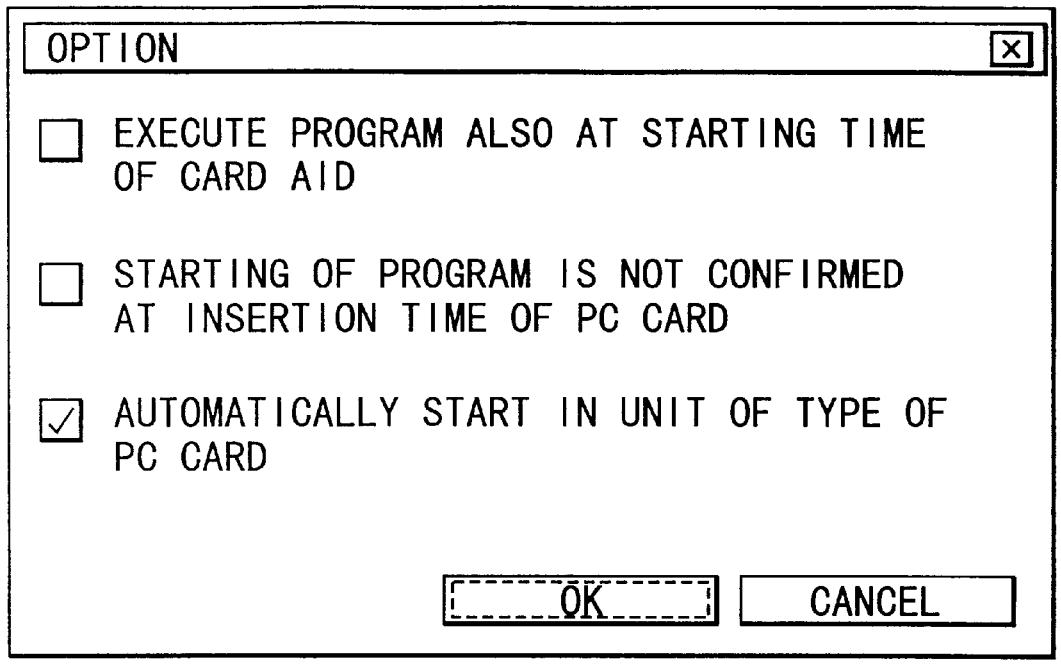
FIGS. 10A to 10D are diagrams showing dialogue boxes used for setting card/program registration information in the unit of type of the PC card.

The user effects an adequate operation to display the display screen of "option" shown in FIG. 10A. In this state, for example, the user selects "automatic starting in the unit of type of PC card" from a plurality of choices previously prepared and then depresses the OK button.

Figure 10B:
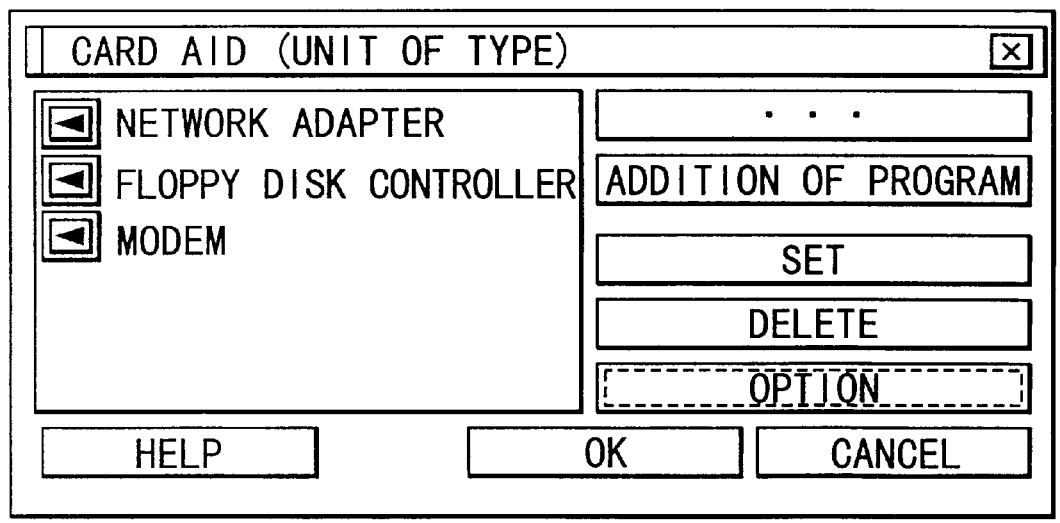

As a result, a display screen for "unit of type" is displayed as shown in FIG. 10B. In this example, the type names of the "PC card information" are displayed.

At this time, for example, the user selects and determines "modem" from the plurality of prepared type names.

Figure 10C:
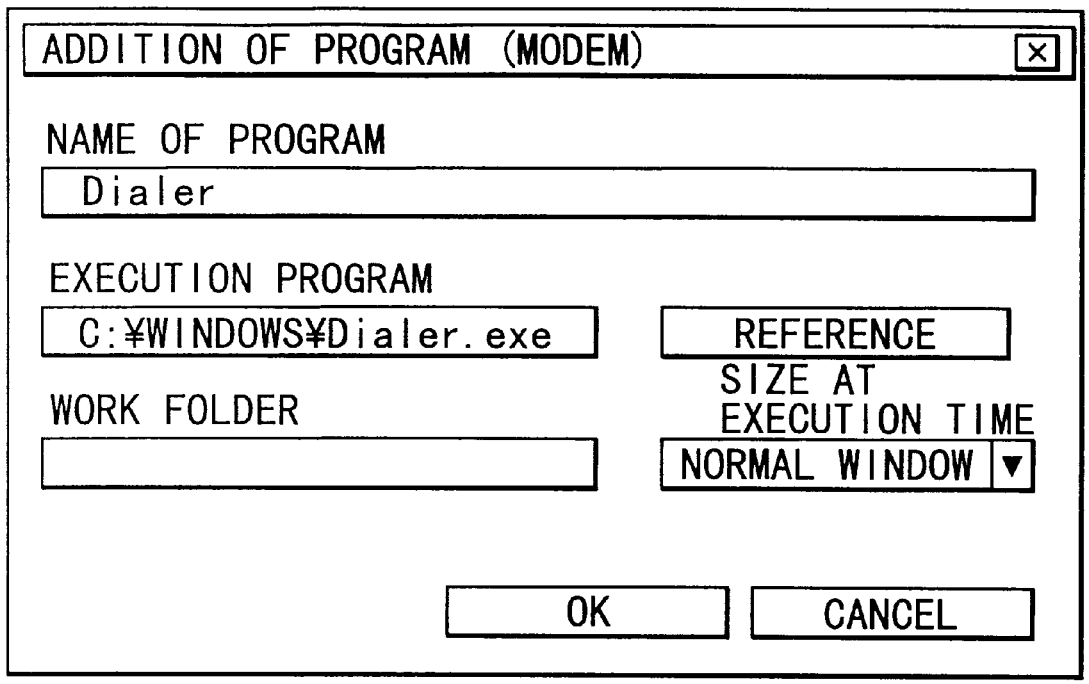

Next, the user effects an adequate operation to display "addition of program" of FIG. 10C. At this time, the name of program, execution program and other information corresponding to the type name "modem" which is previously determined are input and determined. For example, "Dialer" is input as the name of the program, "Dialer.exe" is input as the execution program, and then the OK button is depressed.

Figure 10D:
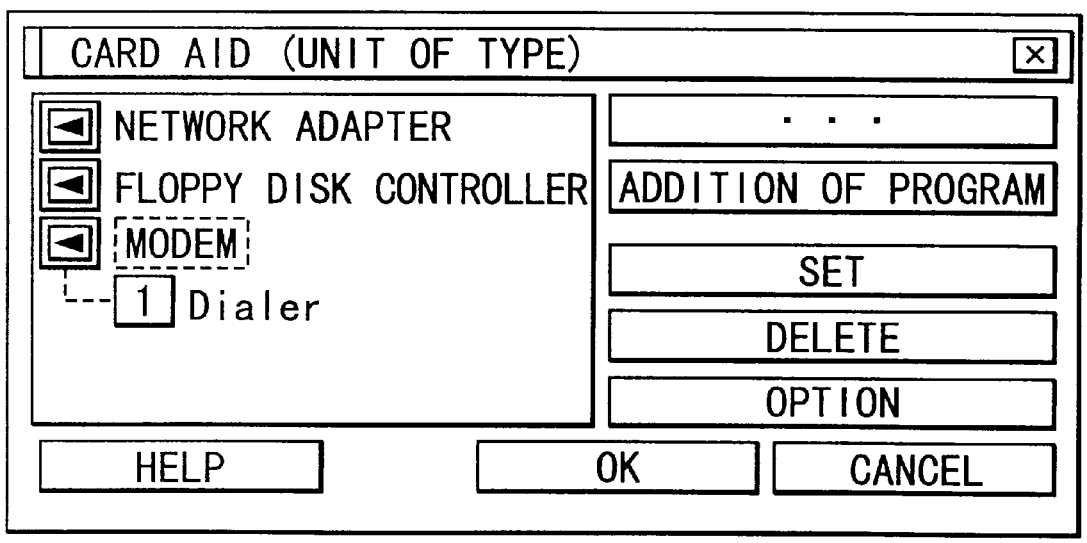

As a result, as shown in FIG. 10D, the correspondence relation between the type name "modem" and the program name "Dialer" is displayed. By determining this relation, the setting process is completed.

Set information obtained at this time is reflected on information under the class key 72 and "program" key 721 among the card/program registration information "Hkey_Local_Machine¥Enum¥PCMCIA" in the registry 32. At the same time, the type name "modem" is registered for the character string "class" under the "card" key 71.

Next, the operation of the operating system 31 at the time of insertion/removal of the PC card is explained with reference to the flowchart shown in FIG. 11.

First, if the PC card 171 is inserted into or removed from the PC card slot 17a, for example, the operating system 31 acquires information relating to the PC card 171 via the card controller 16 and CPU 11 (step A11) and reflects the information relating to the PC card 171 on "device information" in the registry 32 (step A12). That is, the operating system 31 additionally registers information relating to the PC card 171 under Hkey_Dyn_Data¥ConfigManager¥Enum at the time of "insertion" and erases the registered information at the time of "removal".

Then, the operating system 31 issues a message WM_devicechange indicating that the environment of various devices connected to the information apparatus is changed (step A13).

Figure 12:
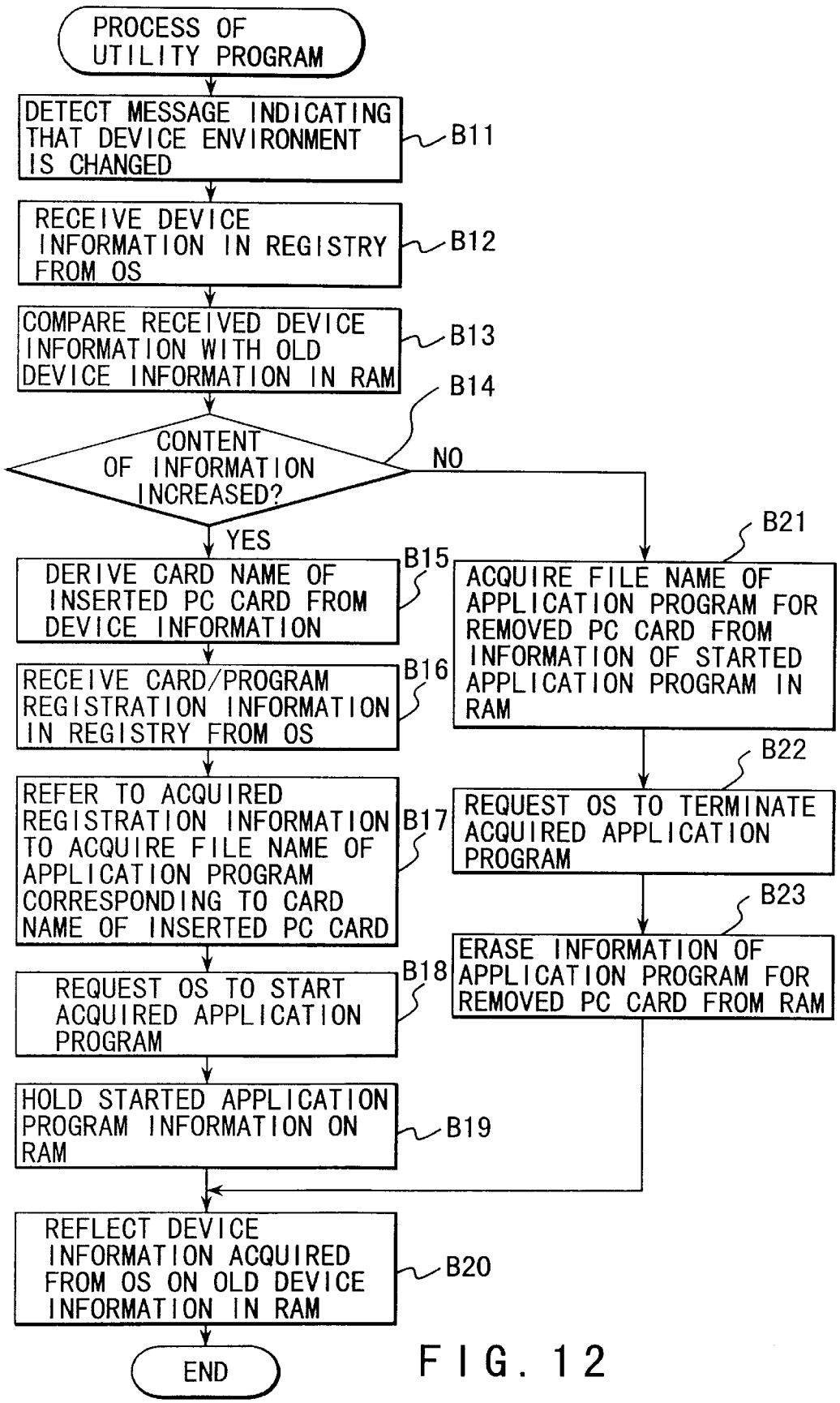
FIG. 12 is a flowchart showing the operation procedure effected by use of a utility program to directly acquire the file name of an application program based on the PC card name.
Figure 13:
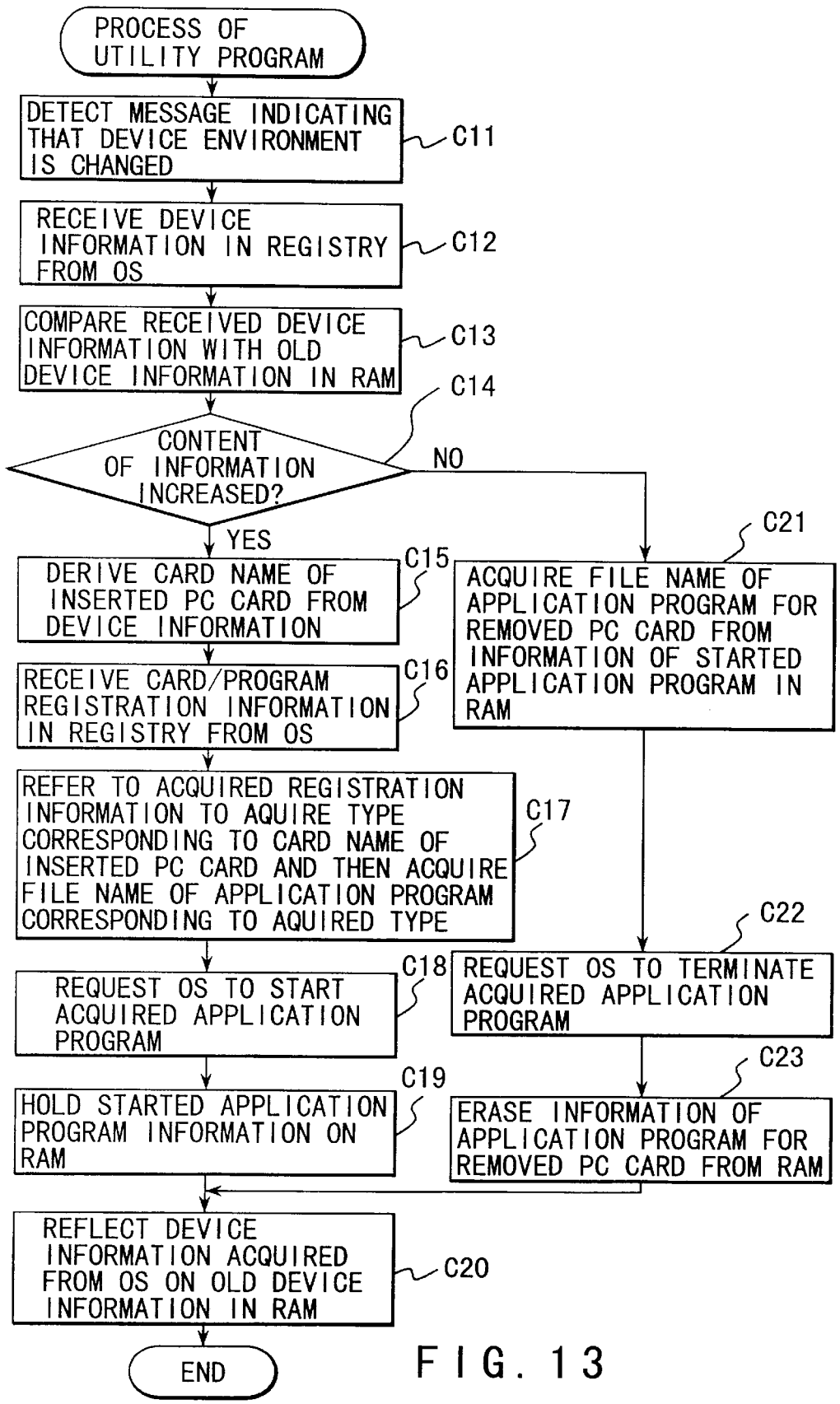
FIG. 13 is a flowchart showing the operation procedure effected by use of a utility program to acquire the file name of an application program after deriving the name of the type from the PC card name.

Next, the operation of the utility program 41 at the time of insertion/removal of the PC card is explained with reference to the flowcharts shown in FIGS. 12 and 13.

First, a case wherein the type of the PC card is not specified for information of "class" of FIG. 8C is explained with reference to the flowchart of FIG. 12. In this case, information of the application program corresponding to the name of the PC card is derived without receiving any influence by the type of the PC card.

If a message WM_devicechange indicating that the device environment is changed is issued from the operating system 31, the utility program 41 detects the issuance of the message (step B11). At the same time, it determines that a parameter called wParam is set to DBT_DEVNODES_CHANGED.

Next, the utility program 41 requests the operating system 31 to issue device information held in the registry 32 and acquires the device information (step B12).

Then, the utility program 41 compares the acquired device information with the old device information previously held in the RAM 23 (step B13).

The utility program 41 regards the state as an "insertion" state when the content of the device information is increased ("YES" in the step B14) and acquires the card name of the inserted PC card from the device information (step B15).

Next, the utility program 41 requests the operating system 31 to issue card/program registration information held in the registry 32 and acquires the card/program registration information (step B16).

Then, the utility program 41 acquires the file name of an application program (execution program) corresponding to the card name of the inserted PC card (step B17) by referring to the acquired card/program registration information and then requests the operating system 31 to start the application program (step B18).

At this time, the utility program 41 holds information relating to the started application program in the RAM 23 (step B19). Further, the utility program 41 reflects the device information acquired from the operating system 31 on the old device information in the RAM 23 (step B20).

On the other hand, if it is detected in the step B13 that the content of the device information is reduced, the utility program 41 regards the state as a "removal" state ("NO" in the step B14), acquires the file name of an application program (execution program) corresponding to the removed PC card from information of the application program held in the RAM 23 and now executed (step B21), and then requests the operating system 31 to terminate the application program (step B22).

At this time, the utility program 41 erases information of the application program for the removed PC card from the RAM 23 (step B23). Further, the utility program 41 reflects the device information acquired from the operating system 31 on the old device information in the RAM 23 (step B20).

Thus, when the PC card is inserted into the card slot 17*a* or 17*b,* an application program corresponding to the name of the PC card is automatically started, and when the PC card is removed, the application program is automatically terminated.

Next, a case wherein the type of a PC card is specified for information of "class" of FIG. 8C is explained with reference to the flowchart of FIG. 13. In this case, a step of deriving the type of the PC card corresponding to the name of the PC card is first effected, and then, a step of deriving information of an application program corresponding to the type of the PC card is effected.

First, when WM_devicechange indicating that the device environment is changed is issued from the operating system, the utility program 41 detects the issuance of the message (step C11).

Then, the utility program 41 requests the operating system 31 to issue device information held in the registry 32 and acquires information (step C12).

Then, the utility program 41 compares the acquired device information with the old device information previously held in the RAM 23 (step C13).

The utility program 41 regards the state as an "insertion" state when the content of the device information is increased ("YES" in the step C14) and acquires the card name of the inserted PC card from the device information (step C15).

Next, the utility program 41 requests the operating system 31 to issue card/program registration information held in the registry 32 and acquires the card/program registration information (step C16).

Then, the utility program 41 acquires a type corresponding to the card name of the inserted PC card by referring to the acquired card/program registration information and then acquires the file name of an application program (execution program) corresponding to the acquired type (step C17) and then requests the operating system 31 to start the application program (step C18).

At this time, the utility program 41 holds information relating to the started application program in the RAM 23 (step C19).

Further, the utility program 41 reflects the device information acquired from the operating system 31 on the old device information in the RAM 23 (step C20).

On the other hand, if it is detected in the step C13 that the content of the device information is reduced, the utility program 41 regards the state as a "removal" state ("NO" in the step C14), acquires the file name of an application program (execution program) corresponding to the removed PC card from information of the application program held in the RAM 23 and now executed (step C21), and then requests the operating system 31 to terminate the application program (step C22).

At this time, the utility program 41 erases information of the application program for the removed PC card from the RAM 23 (step C23).

Further, the utility program 41 reflects the device information acquired from the operating system 31 on the old device information in the RAM 23 (step C20).

Thus, when the PC card is inserted into the card slot 17*a* or 17*b,* an application program corresponding to the type of the PC card is automatically started, and when the PC card is removed, the application program is automatically terminated.

If the operation of the present information apparatus is started with the PC card held inside, the operating system 31 will not issue WM_devicechange again and the utility program 41 checks the inserted PC card by referring to the registry 32, and if it is detected that a set application program is present, it starts the application program.

As described above, according to the present invention, it is possible to start/terminate an application program for effecting a process corresponding to a PC card in response to insertion/removal of the PC card. Therefore, the operation of selecting the application program (execution program) effected by the user when the PC card is inserted becomes unnecessary, the environment suitable and convenient for the user can be realized and the operating efficiency can be enhanced.

Additional advantages and modifications will readily occur to those skilled in the art. Therefore, the present invention in its broader aspects is not limited to the specific details, representative devices, and illustrated examples shown and described herein. Accordingly, various modifications may be made without departing from the spirit or scope of the general inventive concept as defined by the appended claims and their equivalents. For example, a method for controlling the application program explained in the above embodiment can be realized as a computer program which can be executed by use of the processor of a computer and can be stored in a storage medium such as a semiconductor memory, an optical disk such as a CD-ROM and DVD, and a magnetic disk such as a floppy disk and hard disk and distributed.

We claim:

1. An information apparatus comprising:
   a card slot which permits insertion/removal of an expansion card;
   an operating system (OS) having a registry;
   means for registering card/program registration information indicating a correspondence relation between names of various cards and file names of various application programs used for effecting processes for the respective cards into said registry;
   means for acquiring information indicating data of insertion/removal and a name of an expansion card inserted into or removed from said card slot by referring to device information related to devices being connected to said information apparatus and held in said registry; and
   means for deriving a file name of an application program corresponding to the acquired name of the expansion card by referring to the card/program registration information registered in said registry and requesting said OS to start the application program when data of insertion/removal indicates insertion of the expansion card.

2. An information apparatus according to claim 1, further comprising means for acquiring a file name of an application program corresponding to the acquired name of the expansion card by referring to information relating to the application program held in a preset memory and requesting said OS to terminate the application program when the data of insertion/removal indicates removal of the expansion card.

3. An information apparatus comprising:
   a card slot which permits insertion/removal of an expansion card;

an operating system (OS) having a registry;

means for registering card/program registration information indicating a correspondence relation between names of various cards and names of types for the various cards and a correspondence relation between the names of the various types and file names of various application programs used for effecting processes corresponding to the names of the various types into said registry;

means for acquiring information indicating data of insertion/removal and a name of an expansion card inserted into or removed from said card slot by referring to device information related to devices being connected to said information apparatus and held in said registry; and means for deriving a name of type corresponding to the acquired name of the expansion card and deriving a file name of an application program corresponding to the derived name of type by referring to the card/program registration information registered in said registry and requesting said OS to start the application program when the data of insertion/removal indicates insertion of the expansion card.

4. An information apparatus according to claim 3, further comprising means for acquiring a file name of an application program corresponding to the acquired name of the expansion card by referring to information relating to the application program held in a preset memory and requesting said OS to terminate the application program when the data of insertion/removal indicates removal of the expansion card.

5. An information apparatus comprising:

a card slot which permits insertion/removal of an expansion card;

an operating system (OS) having a registry;

means for registering card/program registration information indicating a correspondence relation between names of various cards and file names of various application programs used for effecting processes for the respective cards into said registry;

means for detecting a message issued from said OS when an expansion card is inserted into or removed from said card slot and requesting said OS to refer to device information held in said registry;

means for acquiring information indicating data of insertion/removal and a name of an expansion card inserted into or removed from said card slot by comparing the device information related to devices being connected to said information apparatus and acquired from said OS with old device information held in a memory before the insertion/removal of the expansion card;

means for deriving a file name of an application program corresponding to the acquired name of the expansion card by referring to the card/program registration information registered in said registry and requesting said OS to start the application program when the data of insertion/removal indicates insertion of the expansion card; and means for acquiring a file name of an application program corresponding to the acquired name of the expansion card by referring to information relating to the application program held in a preset memory and requesting said OS to terminate the application program when the data of insertion/removal indicates removal of the expansion card.

6. An information apparatus comprising:

a card slot which permits insertion/removal of an expansion card;

an operating system (OS) having a registry;

means for registering card/program registration information indicating a correspondence relation between names of various cards and names of types for the various cards and a correspondence relation between the names of the various types and file names of various application programs used for effecting processes corresponding to the names of the various types into said registry;

means for detecting a message issued from said OS when an expansion card is inserted into or removed from said card slot and requesting said OS to refer to device information held in said registry;

means for acquiring information indicating data of insertion/removal and a name of an expansion card inserted into or removed from said card slot by comparing the device information related to devices being connected to said information apparatus and acquired from said OS with old device information held in a memory before the insertion/removal of the expansion card;

means for deriving a name of type corresponding to the acquired name of the expansion card and deriving a file name of an application program corresponding to the acquired name of type by referring to the card/program registration information registered in said registry and requesting said OS to start the application program when the data of insertion/removal indicates insertion of the expansion card; and means for acquiring a file name of an application program corresponding to the acquired name of the expansion card by referring to information relating to the application program held in a preset memory and requesting said OS to terminate the application program when the data of insertion/removal indicates removal of the expansion card.

7. A program starting control method for an information apparatus including a card slot which permits insertion/removal of an expansion card and an operating system (OS) having a registry, said method comprising the steps of:

registering card/program registration information indicating a correspondence relation between names of various cards and file names of various application programs used for effecting processes for the respective cards into said registry;

acquiring information indicating data of insertion/removal and a name of an expansion card inserted into or removed from said card slot by referring to device information related to devices being connected to said information apparatus and held in said registry; and deriving a file name of an application program corresponding to the acquired name of the expansion card by referring to the card/program registration information registered in said registry and requesting said OS to start the application program when the data of insertion/removal indicates insertion of the expansion card.

8. A method according to claim 7, further comprising the step of acquiring a file name of an application program corresponding to the acquired name of the expansion card by referring to information relating to the application program held in a preset memory and requesting said OS to terminate the application program when the data of insertion/removal indicates removal of the expansion card.

9. A program starting control method for an information apparatus including a card slot which permits insertion/removal of an expansion card and an operating system (OS) having a registry, said method comprising the steps of:

registering card/program registration information indicating a correspondence relation between names of various cards and names of types for the various cards and a correspondence relation between the names of the various types and file names of various application programs used for effecting processes corresponding to the names of the various types into said registry;

acquiring information indicating data of insertion/removal and a name of an expansion card inserted into or removed from said card slot by referring to device information related to devices being connected to said information apparatus and held in said registry; and deriving a name of type corresponding to the acquired name of the expansion card and deriving a file name of an application program corresponding to the derived name of type by referring to the card/program registration information registered in said registry and requesting said OS to start the application program when the data of insertion/removal indicates insertion of the expansion card.

10. A method according to claim 9, further comprising the step of acquiring a file name of an application program corresponding to the acquired name of the expansion card by referring to information relating to the application program held in a preset memory and requesting said OS to terminate the application program when the data of insertion/removal indicates removal of the expansion card.

11. A program starting control method for an information apparatus including a card slot which permits insertion/removal of an expansion card and an operating system (OS) having a registry, said method comprising the steps of:

registering card/program registration information indicating a correspondence relation between names of various cards and file names of various application programs used for effecting processes for the respective cards into said registry;

detecting a message issued from said OS when an expansion card is inserted into or removed from said card slot and requesting said OS to refer to device information held in said registry;

acquiring information indicating data of insertion/removal and a name of an expansion card inserted into or removed from said card slot by comparing the device information related to devices being connected to said information apparatus and acquired from said OS with old device information held in a memory before the insertion/removal of the expansion card;

deriving a file name of an application program corresponding to the acquired name of the expansion card by referring to the card/program registration information registered in said registry and requesting said OS to start the application program when the data of insertion/removal indicates insertion of the expansion card; and acquiring a file name of an application program corresponding to the acquired name of the expansion card by referring to information relating to the application program held in a preset memory and requesting said OS to terminate the application program when the data of insertion/removal indicates removal of the expansion card.

12. A program starting control method for an information apparatus including a card slot which permits insertion/removal of an expansion card and an operating system (OS) having a registry, said method comprising the steps of:

registering card/program registration information indicating a correspondence relation between names of various cards and names of types for the various cards and a correspondence relation between the names of the various types and file names of various application programs used for effecting processes corresponding to the names of the various types into said registry;

detecting a message issued from said OS when an expansion card is inserted into or removed from said card slot and requesting said OS to refer to device information held in said registry;

acquiring information indicating data of insertion/removal and a name of an expansion card inserted into or removed from said card slot by comparing the device information related to devices being connected to said information apparatus and acquired from said OS with old device information held in a memory before the insertion/removal of the expansion card;

deriving a name of type corresponding to the acquired name of the expansion card and deriving a file name of an application program corresponding to the acquired name of type by referring to the card/program registration information registered in said registry and requesting said OS to start the application program when the data of insertion/removal indicates insertion of the expansion card; and acquiring a file name of an application program corresponding to the acquired name of the expansion card by referring to information relating to the application program held in a preset memory and requesting said OS to terminate the application program when data of insertion/removal of the expansion card indicates the removal.

13. A storage medium having program code instructions stored thereon which is capable of performing program starting control when executed by a processor in an information apparatus including a card slot which permits insertion/removal of an expansion card and an operating system (OS) having a registry, said instructions comprising the steps of:

registering card/program registration information indicating a correspondence relation between names of various cards and file names of various application programs used for effecting processes for the respective cards into said registry;

acquiring information indicating data of insertion/removal and a name of an expansion card inserted into or removed from said card slot by referring to device information related to devices being connected to said information apparatus and held in said registry; and deriving a file name of an application program corresponding to the acquired name of the expansion card by referring to the card/program registration information registered in said registry and requesting said OS to start the application program when the data of insertion/removal indicates insertion of the expansion card.

14. A storage medium according to claim 13, wherein said instructions further comprises the step of acquiring a file name of an application program corresponding to the acquired name of the expansion card by referring to information relating to the application program held in a preset memory and requesting said OS to terminate the application program when the data of insertion/removal indicates removal of the expansion card.

15. A storage medium having program code instructions stored thereon which is capable of performing program starting control when executed by a processor in an information apparatus including a card slot which permits insertion/removal of an expansion card and an operating system (OS) having a registry, said instructions comprising the steps of:

registering card/program registration information indicating a correspondence relation between names of various cards and names of types for the various cards and a correspondence relation between the names of the various types and file names of various application programs used for effecting processes corresponding to the names of the various types into said registry;

acquiring information indicating data of insertion/removal and a name of an expansion card inserted into or remove from said card slot by referring to device information related to devices being connected to said information apparatus and held in said registry; and deriving a name of type corresponding to the acquired name of the expansion card and deriving a file name of an application program corresponding to the derived name of type by referring to the card/program registration information registered in said registry and requesting said OS to start the application program when the data of insertion/removal indicates insertion of the expansion card.

16. A storage medium according to claim 15, wherein said instructions further comprises the step of acquiring a file name of an application program corresponding to the acquired name of the expansion card by referring to information relating to the application program held in a preset memory and requesting said OS to terminate the application program when the data of insertion/removal indicates removal of the expansion card.

17. A storage medium having program code instructions stored thereon which is capable of performing program starting control when executed by a processor in an information apparatus including a card slot which permits insertion/removal of an expansion card and an operating system (OS) having a registry, said instructions comprising the steps of:

registering card/program registration information indicating a correspondence relation between names of various cards and file names of various application programs used for effecting processes for the respective cards into said registry;

detecting a message issued from said OS when an expansion card is inserted into or removed from said card slot and requesting said OS to refer to device information related to devices being connected to said information apparatus and held in said registry;

acquiring information indicating data of insertion/removal and a name of an expansion card inserted into or removed from said card slot by comparing the device information acquired from said OS with old device information held in a memory before the insertion/removal of the expansion card;

deriving a file name of an application program corresponding to the acquired name of the expansion card by referring to the card/program registration information registered in said registry and requesting said OS to start the application program when the data of insertion/removal indicates insertion of the expansion; and acquiring a file name of an application program corresponding to the acquired name of the expansion card by referring to information relating to the application, program held in a preset memory and requesting said OS to terminate the application program when the data of insertion/removal indicates removal of the expansion card.

18. A storage medium having program code instructions stored thereon which is capable of performing program starting control when executed by a processor in an information apparatus including a card slot which permits insertion/removal of an expansion card and an operating system (OS) having a registry, said instructions comprising the steps of:

registering card/program registration information indicating a correspondence relation between names of various cards and names of types for the various cards and a correspondence relation between the names of the various types and file names of various application programs used for effecting processes corresponding to the names of the various types into said registry;

detecting a message issued from said OS when an expansion card is inserted into or removed from said card slot and requesting said OS to refer to device information held in said registry;

acquiring information indicating data of insertion/removal and a name of an expansion card inserted into or removed from said card slot by comparing the device information related to devices being connected to said information apparatus and acquired from said OS with old device information held in a memory before the insertion/removal of the expansion card;

deriving a name of type corresponding to the acquired name of the expansion card and deriving a file name of an application program corresponding to the acquired name of the expansion card by referring to the card/program registration information registered in said registry and requesting said OS to start the application program when the data of insertion/removal indicates insertion of the expansion card; and acquiring a file name of an application program corresponding to the acquired name of the expansion card by referring to information relating to the application program held in a preset memory and requesting said OS to terminate the application program when the data of insertion/removal indicates removal of the expansion card.

19. An information apparatus comprising:

an expansion card slot which permits insertion/removal of an expansion card;

insertion detecting means for detecting that the expansion card is inserted to the expansion card slot; and starting means for starting an application program associated with the expansion card when the insertion of the expansion card is detected by said insertion detecting, means.

20. An information apparatus according to claim 19, further comprising means for holding card/program registration information indicating a correspondence relation between various cards and various application programs used for effecting processes for the respective cards.

21. An information apparatus according to claim 20, further comprising means for detecting a message issued from and operating system when an expansion card is inserted into said expansion card slot and requesting the operating system to refer to device information related to devices being connected to said information apparatus.

22. An information apparatus according to claim 21, further comprising means for acquiring information indicating the insertion and a name of an expansion card inserted into said expansion card slot by comparing the device information acquired from the operating system with old device information held in a memory before the insertion of the expansion card.

23. An information apparatus according to claim 22, further comprising means for obtaining a file name of an application program corresponding to the acquired name of the expansion cad by referring to the card/program registration information held by said holding means, and requesting the operating system to start the application program.

24. An information apparatus comprising:
an expansion card slot which permits insertion/removal of an expansion card;
insertion detecting means for detecting that the expansion card is inserted to the expansion card slot;
determining means for determining a type of the expansion card when the insertion of the expansion card is detected by said insertion detecting means; and
starting means for starting an application program associated with the expansion card in accordance with a determination result of said determining means.

25. An information apparatus according to claim 24, wherein a table on which a card name of the expansion card is associated with the type thereof is provided in a storage area, and said determining means determines the type of the expansion card by referring to said table on the basis of a card name included in identification data stored in the expansion card.

26. An information apparatus according to claim 24, further comprising means for holding card/program registration information indicating a correspondence relation between names of various cards and names of types for the various cards and a correspondence relation between the names of the various types and file names of various application programs used for effecting processes corresponding to the names of the various types.

27. An information apparatus according to claim 26, further comprising means for detecting a message issued from an operating system when an expansion card is inserted into said expansion card slot and requesting the operating system to refer to device information related to devices being connected to said information apparatus.

28. An information apparatus according to claim 27, further comprising means for acquiring information indicting the insertion and a name of an expansion card inserted into said expansion card slot by comparing the device information acquired from the operating system with old device information held in a memory before the insertion of the expansion card.

29. An information apparatus according to claim 28, further comprising means for obtaining a name of type corresponding to the acquired name of the expansion card and obtaining a file name of an application program corresponding to the obtained name of type by referring to the card/program registration information held by said holding means, and requesting the operating system to start the application program.

30. An information apparatus comprising:
an expansion card slot which permits removal of an expansion card;
removal detecting means for detecting that the expansion card is removed from the expansion card slot; and
terminating means for terminating an application program associated with the expansion card when the removal of the expansion card is detected by said removal detecting means.

31. An information apparatus according to claim 30, further comprising means for detecting a message issued from an operating system when an expansion card is removed from said expansion card slot and requesting the operating system to refer to device information related to devices being connected to said information apparatus.

32. An information apparatus according to claim 31, further comprising means for acquiring information indicating the removal and a name of an expansion card removed from said expansion card slot by comparing the device information acquired from the operating system with old device information held in a memory before the removal of the expansion card.

33. An information apparatus according to claim 32, further comprising means for acquiring a file name of an application program corresponding to the acquired name of the expansion card by referring to information relating to the application program held in a preset memory, and requesting the operating system to terminate the application program.

34. An information apparatus comprising:
an expansion card slot which permits insertion/removal of an expansion card;
insertion detecting means for detecting that the expansion card is inserted to the expansion card slot; removal detecting means for detecting that the expansion card is removed from the expansion card slot;
starting means for starting an application program associated with the expansion card when the insertion of the expansion card is detected by said insertion detecting means; and
terminating means for terminating an application program associated with the expansion card when the removal of the expansion card is detected by said removal detecting means.

35. An information apparatus according to claim 34, further comprising means for holding card/program registration information indicating a correspondence relation between various cards and various application programs used for effecting processes for the respective cards.

36. An information apparatus according to claim 35, further comprising means for detecting a message issued from an operating system when an expansion card is inserted into or removed from said expansion card slot and requesting the operating system to refer to device information related to devices being connected to said information apparatus.

37. An information apparatus according to claim 36, further comprising means for acquiring information indicating data of insertion/removal and a name of an expansion card inserted into or removed from said expansion card slot by comparing the device information acquired from the operating system with old device information held in a memory before the insertion/removal of the expansion card.

38. An information apparatus according to claim 37, further comprising:
means for obtaining a file name of an application program corresponding to the acquired name of the expansion card by referring to the card/program registration information held by said holding means, and requesting the operating system to start the application program when the data of insertion/removal indicates insertion of the expansion card; and
means for acquiring a file name of an application program corresponding to the acquired name of the expansion card by referring to information relating to the application program held in a preset memory, and requesting the operating system to terminate the application program when the data of insertion removal indicates removal of the expansion card.

39. A program starting control method for an information apparatus equipped with an expansion card slot which permits insertion/removal of an expansion card, comprising the steps of:

detecting that the expansion card is inserted to the expansion card slot;

starting an application program associated with the expansion card when the insertion of the expansion card is detected.

40. A program starting control method according to claim 39, further comprising the step of holding card/program registration information indicting a correspondence relation between various cards and various application programs used for effecting processes for the respective cards.

41. A program staring control method according to claim 40, further comprising the step of detecting a message issued from an operating system when an expansion card is inserted into said expansion card slot and requesting the operating system to refer to device information related to devices being connected to said information apparatus.

42. A program starting control method according to claim 41, further comprising the step of acquiring information indicating the insertion and a name of an expansion card inserted into said expansion card slot by comparing the device information acquired from the operating system with old device information held in a memory before the insertion of the expansion card.

43. A program starting control method according to claim 42, further comprising the step of obtaining a file name of an application program corresponding to the acquired name of the expansion card by referring to the card/program registration information held by said holding means, and requesting the operating system to start the application program.

44. A program starting control method according to claim 39, further comprising the step of holding card/program registration information indicating a correspondence relation between names of various cards and names of types for the various cards and a correspondence relation between the names of the various types and file names of various application programs used for effecting processes corresponding to the names of the various types.

45. A program terminating control method for an information apparatus equipped with an expansion card slot which permits insertion/removal of an expansion card, comprising the steps of:

detecting that the expansion card is removed from the expansion card slot; and terminating an application program associated with the expansion card removed.

46. A program terminating control method according to claim 45, further comprising the step of detecting a message issued from an operating system when an expansion card is removed from said expansion card slot and requesting the operating system to refer to device information related to devices being connected to said information apparatus.

47. A program terminating control method according to claim 46, further comprising the step of acquiring information indicating the removal and a name of an expansion card removed from said expansion card slot by comparing the device information acquired from the operating system with old device information held in a memory before the removal of the expansion card.

48. A program terminating control method according to claim 47, further comprising the step of acquiring a file name of an application program corresponding to the acquired name of the expansion card by referring to information relating to the application program held in a preset memory, and requesting the operating system to terminate the application program.

\* \* \* \* \*

UNITED STATES PATENT AND TRADEMARK OFFICE
CERTIFICATE OF CORRECTION

PATENT NO. : 6,055,595
DATED : April 25, 2000
INVENTOR(S) : Yoshimi TACHIBANA et al.

It is certified that error appears in the above-identified patent and that said Letters Patent is hereby corrected as shown below:

Claim 14, col. 16, line 64, "comprises" should read --comprise--.
Claim 15, col. 17, line 19, "remove" should read --removed--.
Claim 16, col. 17, line 31, "comprises" should read --comprise--.
Claim 17, col. 18, line 3, after "application", delete ",".
Claim 19, col. 18, line 52, "inserted to" should read --inserted into--.
* Claim 19, col. 18, line 55, after "detecting", delete ",".
Claim 21, col. 18, line 64, "and operating" should read --an operating--.
Claim 23, col. 19, line 10, "expansion cad" should read --expansion card--.
Claim 28, col. 19, lines 45-46, "indicting" should read --indicating--.
Claim 39, col. 21, line 8, "inserted to" should read --inserted into--.
Claim 40, col. 21, line 15, "indicting" should read --indicating--.
Claim 41, col. 21, line 18, "staring control" should read --starting control--.

Signed and Sealed this

Twenty-second Day of May, 2001

Attest:

NICHOLAS P. GODICI

*Attesting Officer*

*Acting Director of the United States Patent and Trademark Office*